(12) United States Patent
Kim

(10) Patent No.: US 9,198,213 B2
(45) Date of Patent: Nov. 24, 2015

(54) WI-FI DIRECT CONNECTION METHOD USING ACCESS POINT AND DEVICE HAVING WI-FI DIRECT CONNECTION FUNCTION

(71) Applicant: SAMSUNG ELECTRONICS CO., LTD., Suwon-si (KR)

(72) Inventor: Deok-nam Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 13/944,521

(22) Filed: Jul. 17, 2013

(65) Prior Publication Data

US 2014/0153557 A1    Jun. 5, 2014

(30) Foreign Application Priority Data

Dec. 4, 2012 (KR) .................. 10-2012-0139769

(51) Int. Cl.
*H04W 4/00* (2009.01)
*H04W 76/02* (2009.01)

(52) U.S. Cl.
CPC .................. *H04W 76/023* (2013.01)

(58) Field of Classification Search
None
See application file for complete search history.

(56) References Cited

U.S. PATENT DOCUMENTS

| | | | |
|---|---|---|---|
| 2009/0257416 A1* | 10/2009 | Walker et al. | 370/338 |
| 2011/0082939 A1 | 4/2011 | Montemurro et al. | |
| 2011/0188391 A1 | 8/2011 | Sella et al. | |
| 2012/0099562 A1 | 4/2012 | Smadi et al. | |
| 2012/0133971 A1 | 5/2012 | Park | |
| 2012/0163261 A1 | 6/2012 | Vedantham et al. | |
| 2014/0112324 A1* | 4/2014 | Kwon | 370/338 |

FOREIGN PATENT DOCUMENTS

EP    2 448 328 A1    5/2012

OTHER PUBLICATIONS

Communication dated Apr. 15, 2014, issued by the European Patent Office in counterpart European Application No. 13178767.3.
Wi-Fi Alliance, "Wi-Fi Certified Wi-Fi Direct (TM), Personal, portable Wi-Fi (R) technology," Wi-Fi Alliance, Oct. 25, 2010, pp. 1-14.
Yan et al., "ISD Use Cases", IEEE-SA Mentor, vol. 802.11-12/0854r0, ISD, Jul. 13, 2012, pp. 1-19.

* cited by examiner

*Primary Examiner* — Minh-Trang Nguyen
(74) *Attorney, Agent, or Firm* — Sughrue Mion, PLLC

(57) ABSTRACT

A Wi-Fi Direct connection method for a plurality of devices and a device having a Wi-Fi Direct connection function are disclosed. The Wi-Fi Direct connection method including connecting the plurality of devices through an access point (AP) for communication, making a request through a first device to a second device from among the plurality of devices through the AP to perform a Wi-Fi Direct connection, changing the state of the second device into a standby mode for the Wi-Fi Direct connection in a response to the request for the Wi-Fi Direct connection, performing provisioning discovery by the first device after making the request for the Wi-Fi Direct connection and exchanging a provisioning method with the second device; and accepting the Wi-Fi Direct connection in response to the second device receiving the provisioning discovery request from the first device which has requested the Wi-Fi Direct connection.

12 Claims, 6 Drawing Sheets

WI-FI DIRECT CONNECTION METHOD USING ACCESS POINT AND DEVICE HAVING WI-FI DIRECT CONNECTION FUNCTION

CROSS-REFERENCE TO RELATED APPLICATION

This application claims priority from Korean Patent Application No. 10-2012-0139769, filed on Dec. 4, 2012 in the Korean Intellectual Property Office, the disclosure of which is incorporated herein by reference, in its entirety.

BACKGROUND

1. Field

Apparatuses and methods consistent with the exemplary embodiments relate to a Wi-Fi Direct connection method and a device having a Wi-Fi Direct connection function. More particularly, the exemplary embodiments relate to a Wi-Fi Direct connection method using an access point and a device having a Wi-Fi Direct connection function which enables Wi-Fi Direct connection between a plurality of devices through a simple user manipulation.

2. Description of the Related Art

According to the recent development of wireless communication, there is an increasing number of devices having a Wi-Fi function.

The devices having the Wi-Fi communication function may exchange data through Wi-Fi Direct within a relatively larger area than those using Bluetooth communication.

FIG. 6 is a Wi-Fi Direct connecting method for devices found in the related art. First and second Wi-Fi Direct devices 10 and 20 start Wi-Fi Direct connection through first and second user interfaces (UI) 12 and 22, respectively (S10 and S20). That is, a user activates a Wi-Fi Direct button through the first and second UIs 12 and 22 of the first and second devices 10 and 20, respectively. The first Wi-Fi Direct device 10 requests a connection searches and locates the second Wi-Fi Direct device 20, and displays the second Wi-Fi Direct device 20 through the first UI 12 (S12). Then, the user selects the desired second Wi-Fi Direct device 20, from among other Wi-Fi devices, that has been found through the UI 12, and requests push button connection (PBC) (S14). In response to the PBC request by the user, the first Wi-Fi Direct device 10 performs provisioning discovery with the searched second Wi-Fi Direct device (S32). That is, the first Wi-Fi Direct device 10 transmits a PBC message to the second Wi-Fi Direct device 20 (S32), and the second Wi-Fi Direct device 20 receives the PBC request and displays the reception of the PBC request through the second UI 22 (S22). Lastly, in response to the user accepting the PBC (S24), the Wi-Fi Direct connection between the first and second Wi-Fi Direct devices 10 and 20 may be completed (S34).

As described above, in the case of the known Wi-Fi Direct connection method, a plurality of users or a single user should activate each of the Wi-Fi Direct connection buttons through the first UI 12 of the first Wi-Fi Direct device 10 and the second UI 22 of the second Wi-Fi Direct device 20, and should make a PBC request of the first Wi-Fi Direct device 10 and press the push button of the second Wi-Fi Direct device 20. That is, the Wi-Fi connection is performed through very complicated processes.

Further, users repeat the aforementioned complicated processes to perform the Wi-Fi Direct connection whenever they try to perform the Wi-Fi Direct connection with devices that the users are already aware of. This causes a great deal of inconvenience to users.

SUMMARY

Accordingly, one or more exemplary embodiments provide a Wi-Fi Direct connection method and a device having a Wi-Fi Direct connection function which enables a Wi-Fi Direct connection between a plurality of devices with a user's simple manipulation.

Another exemplary embodiment provides a Wi-Fi Direct connection method and a device having a Wi-Fi Direct connection function, which enables a convenient Wi-Fi Direct connection to a device that is already known.

Still another exemplary embodiment provides a Wi-Fi Direct connection method and a device having a Wi-Fi Direct connection function, which reduces power consumption of a battery.

The foregoing and/or other aspects may be achieved by providing a Wi-Fi Direct connection method for a plurality of devices, including connecting the plurality of devices through an access point (AP) for communication, making a request by a first device to a second device from among the plurality of devices through the AP to perform a Wi-Fi Direct connection, changing the state of the second device into a standby mode for the Wi-Fi Direct connection in a response to the request for the Wi-Fi Direct connection, performing provisioning discovery by the first device after making the request for the Wi-Fi Direct connection and exchanging the provisioning method with the second device; and accepting the Wi-Fi Direct connection in response to the second device receiving the provisioning discovery request from the first device, which has requested the Wi-Fi Direct connection.

The second device may be set in advance to accept the Wi-Fi Direct connection at all times when receiving the provisioning discovery request from the first device which has requested the Wi-Fi Direct connection.

The Wi-Fi Direct connection requested by the first device may be performed through a user input of the first device.

The Wi-Fi Direct connection requested by the first device may be performed by activating a button of a UI for the Wi-Fi Direct connection.

The first and second devices may be aware of an opponent's information in advance.

The first and second devices may recognize in advance that each other is connected to the AP.

The second device may transmit a provisioning discovery reply to the first device when receiving the provisioning discovery request from the first device.

According to aspect of an exemplary embodiment, there is provided a device having a Wi-Fi Direct connection function, including a communicator configured to perform wired/wireless communication through an access point (AP), a user input configured to be used by a user to input a Wi-Fi Direct connection request to another device through the AP, and a controller configured to transmit the input Wi-Fi Direct connection request to the another device connected to the AP, and performs a provisioning discovery with the another device and exchanges a provisioning method with the another device.

The user input may include a button of the UI for the Wi-Fi Direct connection configured to be capable of being changed into activation and deactivation states.

The device may further include a storage which stores therein information related to the another device.

The controller may be configured to recognize that the another device is connected to the AP.

The communicator may be configured to receive a provisioning discovery reply from the another device.

According to aspect of an exemplary embodiment, there is provided a device having a Wi-Fi Direct connection function, including a communicator which performs wired/wireless communication through an access point (AP); and a controller which is changed to a standby mode for the Wi-Fi Direct connection when receiving the Wi-Fi Direct connection request from another device connected to the AP through the communicator, and accepts the Wi-Fi Direct connection with the another device when receiving a provisioning discovery request from the another device, which has requested the Wi-Fi Direct connection.

The controller may accept the Wi-Fi Direct connection at all time with the another device when receiving a provisioning discovery request from the another device which has requested the Wi-Fi Direct connection.

The device may further include a storage which stores therein information related to the another device.

The controller may be configured to recognize in advance that the another device is connected to the AP.

The controller may be configured to transmit a provision discovery reply to the first device when receiving a provisioning discovery request from the another device.

An aspect of an exemplary embodiment may provide a device having a Wi-Fi Direct connection function, the device including: a controller which transmits an input Wi-Fi Direct connection request to another device connected to an access point, and performs a provisioning discovery with the another device and exchanges a provisioning method with the another device. The device may further include a communicator configured to perform wired/wireless communication through the access point, and may further include a user input configured to be used to input a Wi-Fi Direct connection request to another device through the access point.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
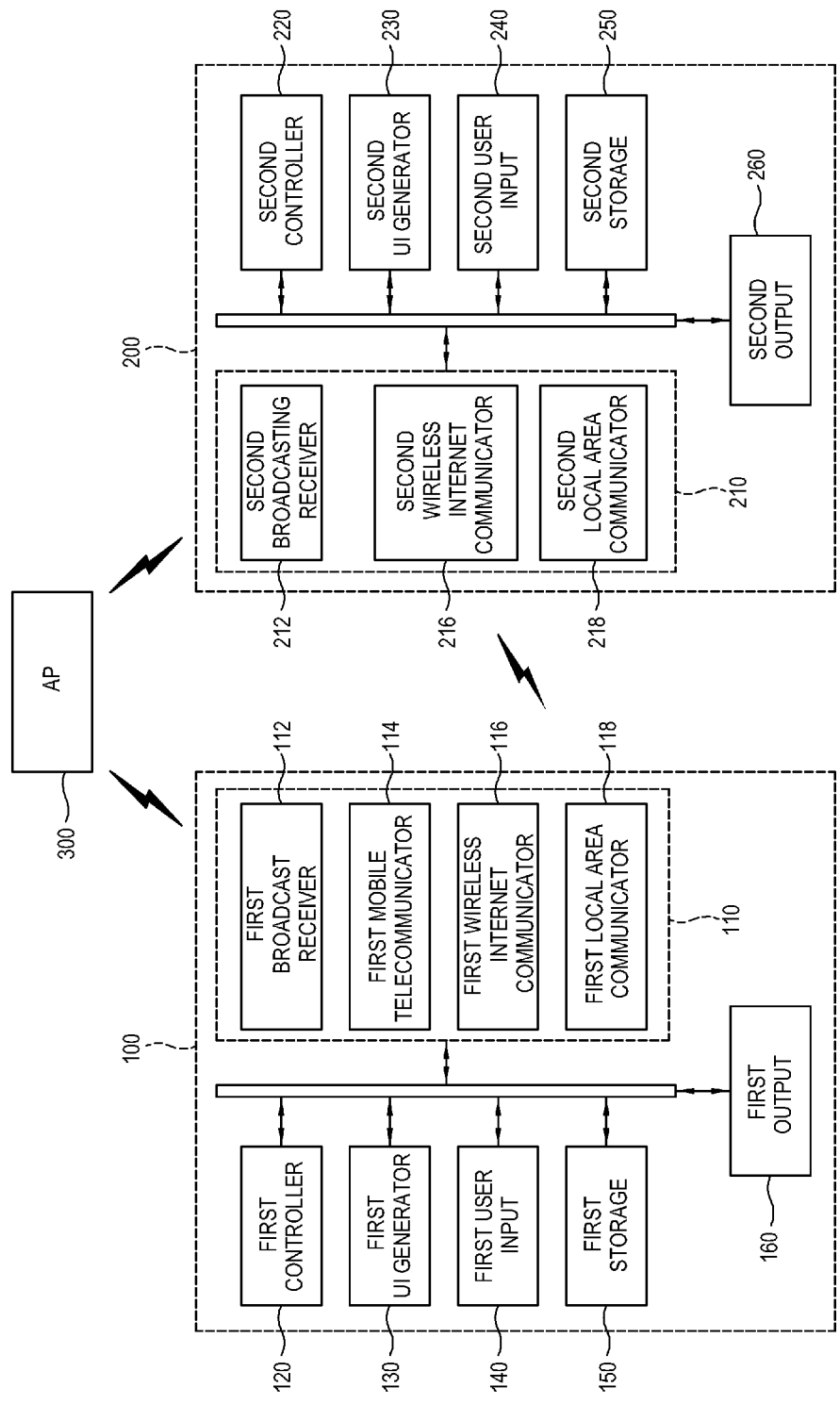
FIG. 1 is a block diagram of devices that may perform Wi-Fi Direct connection, according to an exemplary embodiment.
Figure 2:
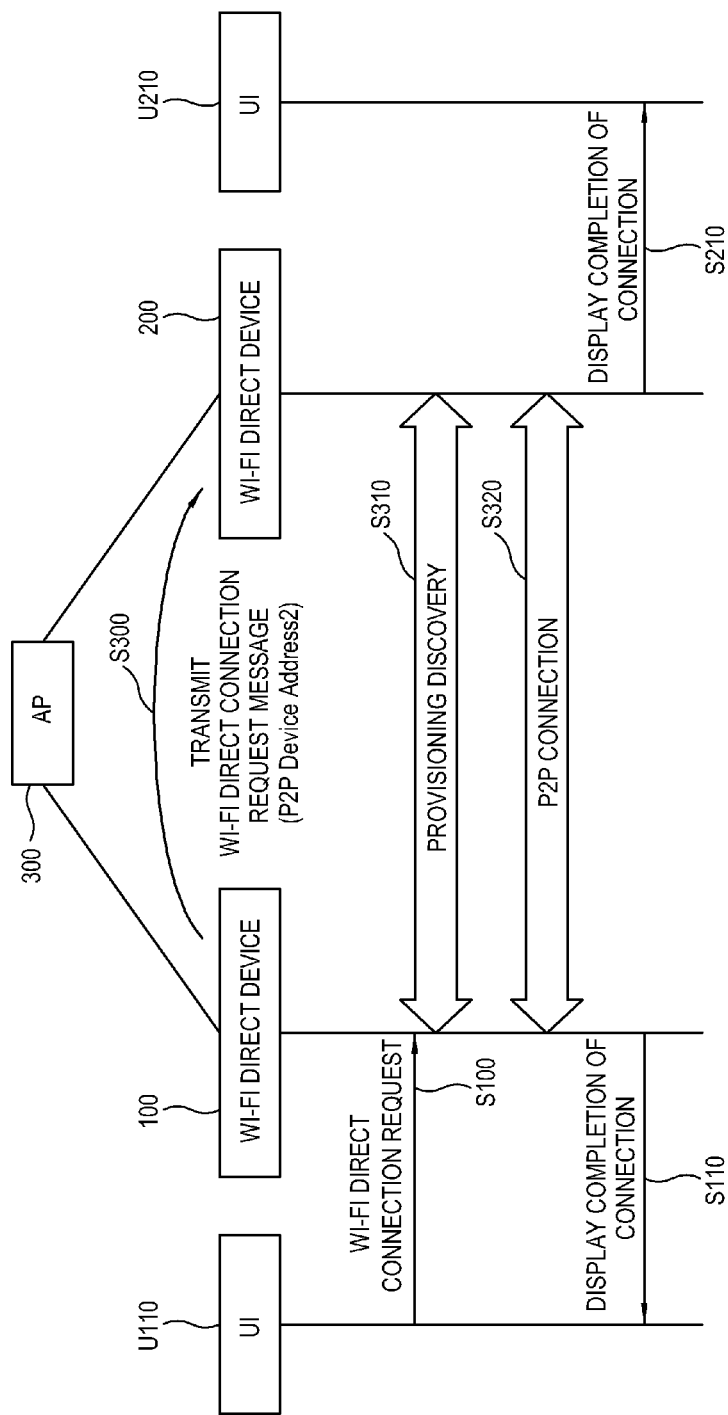
FIG. 2 is a flowchart showing a Wi-Fi Direct connecting method, according to an exemplary embodiment.

Below, exemplary embodiments will be described in detail with reference to the accompanying drawings so as to be easily understood by a person having ordinary knowledge in the art. The exemplary embodiments may be embodied in various forms without being limited to the exemplary embodiments set forth herein. Descriptions of well-known parts may be omitted for clarity, and like reference numerals refer to like elements throughout.

A plurality of devices having a Wi-Fi Direct function 100 and 200 according to an exemplary embodiment may exchange data through Wi-Fi Direct connection using an access point (AP). The plurality of devices 100 and 200 may include, e.g., two or more of smart phone, PDA, laptop computer, digital broadcasting receiving apparatus, navigation, digital TV (DTV), desktop computer, printer, etc. Hereinafter, an example of a mobile telecommunication terminal 100 and a DTV 200 according to an exemplary embodiment will be described as examples of the plurality of devices 100 and 200, in particular detail, with the accompanying drawings.

As shown in FIG. 1, the mobile telecommunication terminal 100 according to an exemplary embodiment may include a first wireless communicator 110, a first controller 120, a first user interface (UI) generator 130, a first user input 140, a first storage 150 and a first output 160. The mobile telecommunication terminal 100 may include other various elements other than the aforementioned elements.

The first wireless communicator 110 may include at least one element which enables a wireless communication between the mobile telecommunication terminal 100 and a wireless communication system, or a wireless communication between the mobile telecommunication terminal 100 and a network in which the mobile telecommunication terminal 100 is located. For example, the first wireless communicator 110 may include a first broadcast receiver 112, a first mobile telecommunication 114, a first wireless internet communication 116, and a first local area communication 118.

The first broadcast receiver 112 may receive a broadcast signal transmitted by a broadcast station through a channel selected by a tuner (not shown). The channel may include satellite and terrestrial channels. The broadcast signal may include TV broadcast signals, radio broadcast signals and data broadcast signals.

The first broadcast receiver 112 may receive digital broadcasting signals through a digital broadcasting system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T).

Broadcast signals and/or information relating to broadcast signals which are received through the first broadcasting receiver 112 may be stored in the first storage 150.

The first mobile telecommunication 114 exchanges wireless signals with at least one of a base station, external terminal and server over a mobile telecommunication network such as 2G, 3G, 4G and Long Term Evolution (LTE). The wireless signal may include various types of data according to exchange of video signals, video call or text/multimedia messages.

The first wireless internet communicator 116 is provided to perform wireless internet connection and may be connected to the Internet through an access point (AP) 300. Wireless Internet technology may include Wireless LAN (WLAN) (Wi-Fi), Wireless broadband (Wibro), World Interoperability for Microwave Access (Wimax), and High Speed Downlink Packet Access (HSDPA).

The first local area communicator 118 may include Bluetooth®, Radio Frequency Identification (RFID)®, Infrared Data Association (IrDA)®, Ultra Wideband (UWB)®, and Zigbee®.

The first controller 120 may control respective elements of the mobile telecommunication terminal 100. For example, the first controller 120 may control the first wireless communicator 110 to request the DTV 200 to perform Wi-Fi Direct connection through the AP 300. The first controller 120 may perform provisioning discovery with the DTV 200 through the first wireless communicator 110 to exchange therewith a provisioning method.

The first controller 120 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, and microprocessors.

The first UI generator 130 may generate a UI that is displayed on a touch screen (not shown). A user may input a command through the UI displayed on the touch screen. The first UI generator 130 may generate a UI to request another Wi-Fi Direct device 200 to perform Wi-Fi Direct connection through the AP 300.

The first user input 140 may include a keypad, a UI on the touch screen, a remote controller, a wireless mouse, a button, etc. That is, the first user input 140 may have various types depending on various devices having the Wi-Fi Direct connecting function. For example, the mobile telecommunication terminal 100 such as a smart phone may generally employ a UI displayed on the touch screen.

The first storage 150 may temporarily store therein programs for processing and controlling of the first controller 120, and input/output data. The first storage 150 may store therein data relating to various types of vibration and sound which are output by a touch input on the touch screen.

The first storage 150 may include at least one storage medium of a flash memory type, hard disk type, multimedia card micro type, a card-type memory (e.g., SD or XD memory), random access memory (RAM), static random access memory (SRAM), read only memory (ROM), electrically erasable programmable read-only memory (EEPROM), programmable read-only memory (PROM), a magnetic memory, magnetic disk, optical disk, etc.

The first output 160 may include a display such as a liquid crystal display (LCD) or an active matrix organic light emitting diode (AMOLED) display configured to display an image signal thereon, and a speaker outputting the image signal. The first output 160 may include a touch screen through which a UI generated by the first UI generator 130 is displayed and a user may directly input a command.

Hereinafter, the DTV 200 will be described in detail as an example of a device that may perform Wi-Fi Direct connection with the mobile telecommunication terminal 100 having the aforementioned Wi-Fi Direct connection function.

As shown in FIG. 1, the DTV 200 according to an exemplary embodiment may include a second wireless communicator 210, a second controller 220, a second UI generator 230, a second user input 240, a second storage 250 and a second output 260. The DTV 200 may further include other various elements in addition to the aforementioned elements.

The second wireless communicator 210 may include a second broadcast receiver 212, a second wireless internet communicator 216, and a second local area communicator 218.

The second broadcast receiver 212 may receive a broadcast signal transmitted by a broadcast station through a channel selected by a tuner (not shown). The channel may include satellite and terrestrial channels. The broadcast signal may include TV broadcast signals, radio broadcast signals and data broadcast signals.

The second broadcast receiver 212 may receive digital broadcasting signals through a digital broadcasting system such as DMB-T, DMB-S, MediaFLO, DVB-H, and ISDB-T.

Broadcast signals and/or information relating to broadcasting which are received through the second broadcast receiver 212 may be stored in the second storage 250.

The second wireless internet communicator 216 is provided to perform wireless internet connection and may be connected to the Internet through the AP 300. Wireless Internet technology may include WLAN (Wi-Fi), Wibro, Wimax, and HSDPA.

The second local area communicator 218 may include Bluetooth®, RFID®, IrDA®, UWB®, and Zigbee®.

The second controller 220 may control overall operations of the DTV including a signal processor (not shown), the second wireless communicator 210, the second user input 240, the second storage 250, and the second signal output 260.

Upon receiving a Wi-Fi Direct connection request from the mobile telecommunication terminal 100 through the AP 300, the second controller 220 may control the second wireless communicator 210 to make the Wi-Fi Direct connection available.

The second controller 220 may include ASICs, DSPs, DSPDs, PLDs, FPGAs, processors, controllers, micro-controllers, and microprocessors.

The second UI generator 230 may generate a UI to process input data and display the data through the second signal output 260. The user may refer to the displayed UI to input a necessary command or to obtain information. The second UI generator 230 may generate a UI for showing Wi-Fi Direct connection request made by another Wi-Fi Direct device 100 through the AP 300.

The second user input 240 may include a keypad, a UI displayed on the touch screen, a remote controller, a wireless mouse, a button, etc. That is, the second user input 240 may include various types of devices, depending on various devices having a Wi-Fi Direct connection function. The DTV 200 may generally employ a remote controller or a button.

The second storage 250 stores therein unlimited data. The second storage 250 is accessed by the second controller 220, which reads/records/modifies/deletes/updates data. The data stored in the second storage 250, may include, e.g., an operating system (OS), various applications which are executed on the OS, device information, image data, additional data, etc.

The second storage 250 may include at least one storage medium of a flash memory type, hard disk type, multimedia card micro type, a card-type memory (e.g., SD or XD memory), RAM, SRAM, ROM, EEPROM, PROM, a magnetic memory, magnetic disk, optical disk, etc.

The second output 260 displays an image thereon based on an image signal, and may be implemented as various displays such as LCD, plasma display panel (PDP), light emitting diode (LED), organic light emitting diode (OLED), surface-conduction electron-emitter, carbon nano-tube, nano-crystal, etc. The second output 260 may include a speaker to play a processed voice.

The AP 300 is connected to the Internet line, and connects the mobile telecommunication terminal 100 to the wireless Internet, and connects the DTV 200 to the wired or wireless Internet.

The AP 300 is a network device which is connected to the Internet line, transmits wired/wireless signals, and allows the plurality of devices 100 and 200 having the communication function to share a single Internet line and access the Internet.

The AP 300 is an internet protocol (IP) address router and assigns inherent IP address as virtual IP address to connected devices to enable the devices to access the Internet.

The AP 300 may receive a Wi-Fi Direct connection request message from one of the plurality of Wi-Fi Direct devices, e.g., the mobile telecommunication terminal 100 and transmit the request message to another Wi-Fi Direct device, e.g., the DTV 200.

Hereinafter, a Wi-Fi Direct connection method for a plurality of Wi-Fi Direct devices using the AP 300 according to an exemplary embodiment will be described with reference to accompanying drawings.

To perform the Wi-Fi Direct connection method according to an exemplary embodiment, a first Wi-Fi Direct device 100 and a second Wi-Fi Direct device 200 which are intended to be connected to each other, should know each other's information, i.e. P2P device address. The information of the other device may be obtained by a known Wi-Fi Direct connection method, or may be input by the user. In an exemplary embodiment, the method of obtaining the information relating to the other device, is not specifically limited.

In response to the first Wi-Fi Direct device 100 and the second Wi-Fi Direct device 200 which are intended to be connected to each other being connected to the same AP 300, the first and second Wi-Fi Direct devices 100 and 200 should recognize that the other device is connected to the same AP 300. Connection of the other device to the AP 300 may be recognized by searching for the device based on device information (P2P device address) using UPnP. Of course, the method of recognizing the connection of the other device to the AP 300 is not specifically limited.

First, the user inputs a command for Wi-Fi Direct connection with respect to a desired second Wi-Fi Direct device 200 through the UI 110 of the first Wi-Fi Direct device 100. The second Wi-Fi Direct device 200 is known to the first Wi-Fi Direct device 100 user in advance. According to the user's command, the first Wi-Fi Direct device 100 transmits the Wi-Fi Direct connection request message to the second Wi-Fi Direct device 200 through the AP 300 (S300).

Upon receiving the Wi-Fi Direct connection request message, the second Wi-Fi Direct device 200 enters a standby mode for performing Wi-Fi Direct connection. The standby mode means the change into a state in which one Wi-Fi Direct device may be connected to another Wi-Fi Direct device.

Thereafter, the first Wi-Fi Direct device 100 performs provisioning discovery, i.e., transmits a provisioning discovery request message and receives a provisioning discovery reply, and exchanges a provisioning method with the second Wi-Fi Direct device 200 (S310).

The second Wi-Fi Direct device 200 always accepts provisioning discovery whenever receiving the provisioning discovery request message from the Wi-Fi Direct device 100 that has transmitted the Wi-Fi Direct connection request message. The second Wi-Fi Direct device 200 should be set in advance to always accept the Wi-Fi Direct connection, upon receiving the provision discovery request message from the Wi-Fi Direct device 100 that has transmitted the Wi-Fi Direct connection request message. Of course, the acceptance of the Wi-Fi Direct connection may be displayed as a menu in a UI 210, for user's selection.

Lastly, the Wi-Fi Direct connection is performed between the first and second Wi-Fi Direct devices 100 and 200 (S320).

In response to the Wi-Fi Direct connection being completed, the UIs 110 and 210 of the first and second Wi-Fi Direct devices 100 and 200, respectively, display the completion of connection (S110 and S210).

As described above, the Wi-Fi Direct connecting method for a plurality of Wi-Fi Direct connection devices 100 and 200, according to an exemplary embodiment may be performed through a very simple manipulation.

Hereinafter, the Wi-Fi Direct connection process will be described with reference to UIs 410, 510 and 610 in FIGS. 3 to 5.

Figure 3:
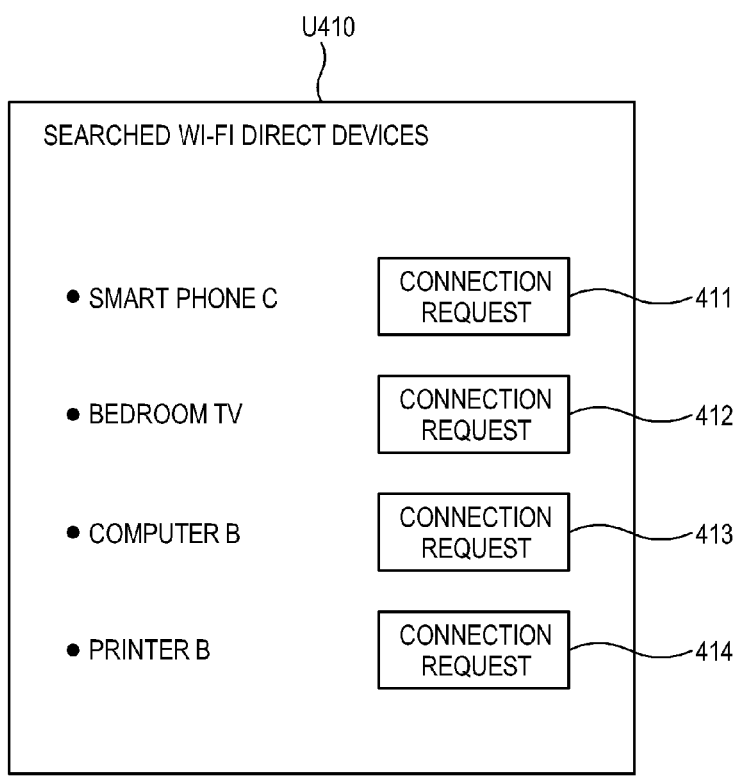
FIGS. 3 to 5 illustrate user interfaces for Wi-Fi Direct connection, according to an exemplary embodiment.

As shown in FIG. 3, a smart phone A may display known Wi-Fi Direct devices that have been connected or searched for before, e.g. smart phone C, a bedroom TV, computer B and printer B through the UI 410. For the displayed smart phone C, the bedroom TV, computer B and printer B, 'connection request' buttons 411, 412, 413 and 414 are provided respectively.

In response to the user pressing or activating the "connection request" button 412 to attempt the Wi-Fi Direct connection request of the bedroom TV through the smart phone A, the smart phone A transmits the Wi-Fi Direct connection request message to the bedroom TV 200 connected to the AP 300.

Figure 4:
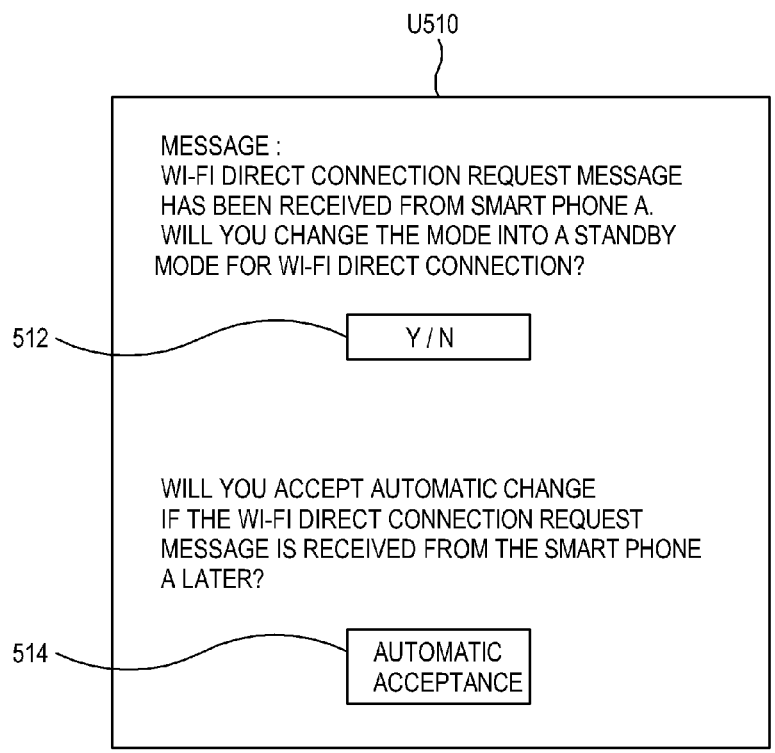

Upon receiving the Wi-Fi Direct connection request message through the AP 300, the bedroom TV 200 may display a UI 510 as shown in FIG. 4. Of course, the UI 510 is not required, and the bedroom TV 200 may be set to change into the standby mode to perform Wi-Fi Direct connection upon receiving the Wi-Fi Direct connection request message.

In the UI 510 in FIG. 4, the user may decide whether to change into the standby mode through a Yes/No button 512. It may be set to perform automatic acceptance upon receiving the Wi-Fi Direct connection request message from the smart phone A. In response to the automatic acceptance being selected, the connection device may be set to perform automatic acceptance whenever the Wi-Fi Direct connect request message is transmitted by the smart phone A.

The single UI 510 displays the Y/N button for selecting to change into the standby mode and the automatic acceptance button 514 together in FIG. 4, but those two buttons may be separately displayed.

Figure 5:
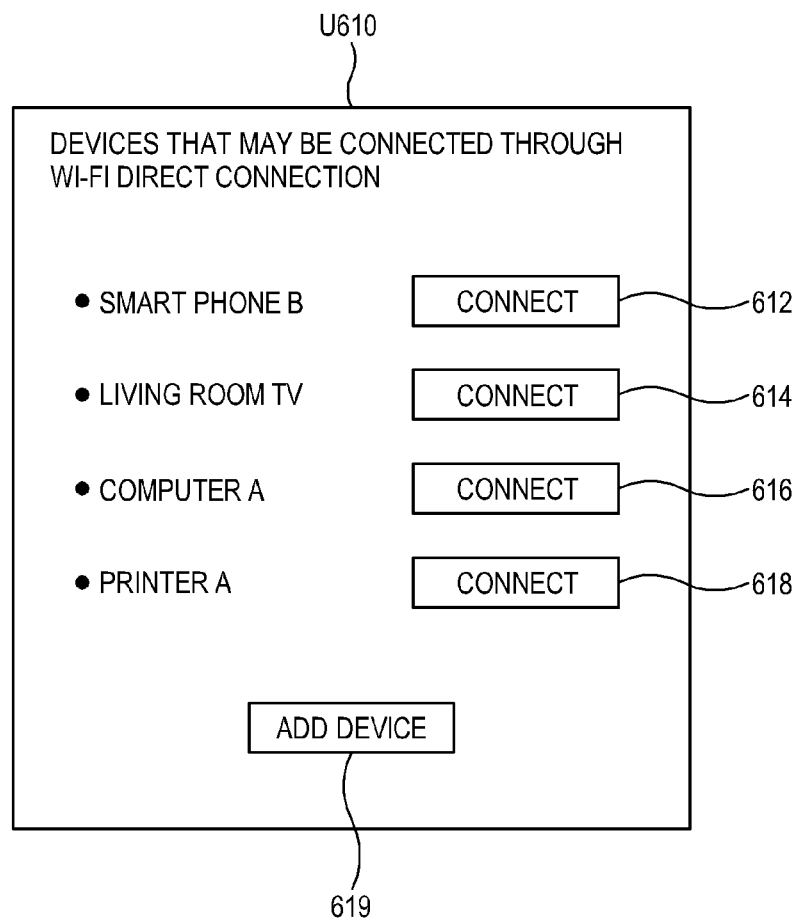
Figure 6:
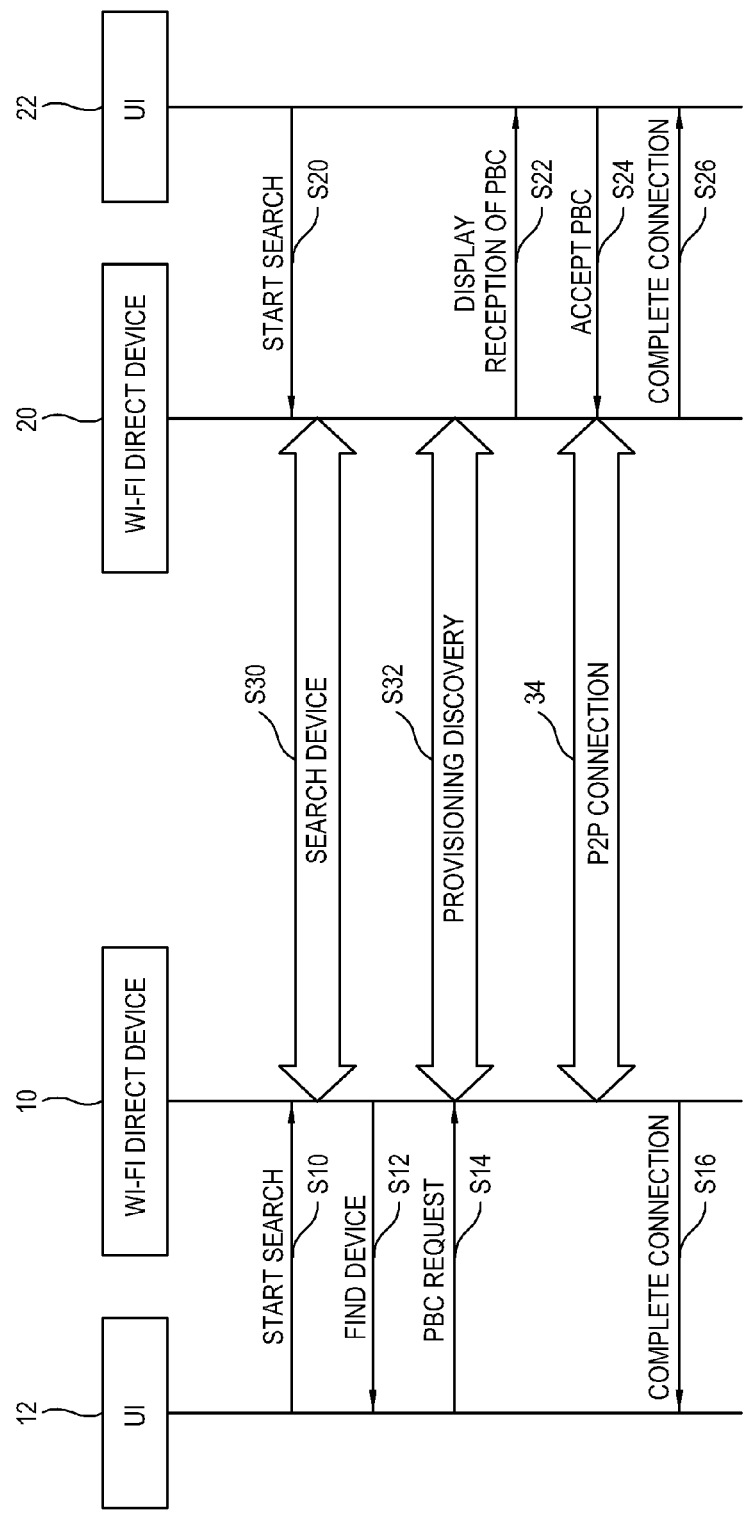
FIG. 6 is a flowchart showing a known Wi-Fi Direct connecting method, used among a plurality of devices.

FIG. 5 illustrates a UI 610 which searches for and displays available peripheral devices that may be connected through the Wi-Fi Direct connection. The searched Wi-Fi Direct devices may be set to grant automatic acceptance whenever receiving the Wi-Fi Direct connection request message through the processes explained with reference to FIG. 4. That is, in response to connection buttons 612, 614, 616 and 618 being selected from a desired counterparty Wi-Fi Direct device, the UI 510 may be displayed in the selected Wi-Fi Direct device as shown in FIG. 4. Of course, the acceptance may be granted through a physical button rather than the UI 510 displayed in the screen. The user herein may refer to an individual user for each Wi-Fi Direct device or may refer to a single user using a plurality of Wi-Fi Direct devices.

In FIG. 5, additional search for the Wi-Fi Direct device may be performed by activating an 'add device' button 619.

According to an exemplary embodiment, Wi-Fi Direct connection is performed by using an access point so that Wi-Fi Direct connection may be performed between a plurality of devices through a simple user manipulation.

According to another exemplary embodiment, there is no need to continuously search for devices having a Wi-Fi Direct connecting function in order to perform Wi-Fi Direct connection, and thus power consumption of a battery may be reduced.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A Wi-Fi Direct connection method for a plurality of devices, the method comprising:
   connecting a first device and a second device through an access point (AP);
   making a request by the first device to perform a Wi-Fi Direct connection;
   transmitting the request by the first device to the second device through the AP;
   changing the state of the second device into a standby mode, in which the second device is available for Wi-Fi Direct connection to the first device, in a response to receiving the request through the AP;
   performing provisioning discovery by the first device after making the request for the Wi-Fi Direct connection and exchanging a provisioning method with the second device; and
   accepting the Wi-Fi Direct connection in response to the second device receiving the provisioning discovery request from the first device which has requested the Wi-Fi Direct connection.

2. The method according to claim 1, wherein the performing and the exchanging are accomplished without displaying by the second device a menu in a UI for user's selection regarding acceptance of the request for the Wi-Fi Direct connection, if the second device is set in advance to accept the Wi-Fi Direct connection, and
   the second device displays the menu in the UI for user's selection regarding acceptance of the request for the Wi-Fi Direct connection, if the second device is not set in advance to accept the Wi-Fi Direct connection.

3. The method according to claim 1, wherein the Wi-Fi Direct connection requested by the first device is performed through a user input of the first device.

4. The method according to claim 3, wherein the Wi-Fi Direct connection requested by the first device is performed by activating a button of a UI for the Wi-Fi Direct connection.

5. The method according to claim 1, wherein the first and second devices are aware of the other devices information in advance.

6. The method according to claim 1, wherein the first and second devices recognize in advance that each other is connected to the AP.

7. The method according to claim 1, wherein the second device transmits a provisioning discovery reply to the first device when receiving the provisioning discovery request from the first device.

8. A device for a Wi-Fi Direct connection with another device, the device comprising:
   a communicator which performs wired/wireless communication with the other device through an access point (AP); and
   a controller which is changed to a standby mode, so that the controller is available for the Wi-Fi Direct connection to the other device when receiving the Wi-Fi Direct connection request from the other device through the AP and accepts the Wi-Fi Direct connection with the other device when receiving a provisioning discovery request from the other device which has requested the Wi-Fi Direct connection.

9. The device according to claim 8, wherein the controller accomplishes performing a provisioning discovery with the other device and exchanging the provisioning discovery with the other device through the Wi-Fi Direct connection without displaying a menu in a UI for use's selection regarding acceptance of the request for the Wi-Fi Direct connection, if the device is set in advance to accept the Wi-Fi Direct connection, and to display the menu in the UI for user's selection regarding acceptance of the request for the Wi-Fi Direct connection, if the device is not set in advance to accept the Wi-Fi Direct connection.

10. The device according to claim 8, further comprising a storage which stores therein information of the other device.

11. The device according to claim 8, wherein the controller recognizes in advance that the other device is connected to the AP.

12. The device according to claim 8, wherein the controller transmits a provisioning discovery reply to the other device when receiving the provisioning discovery request from the other device.

* * * * *